Figure 1:
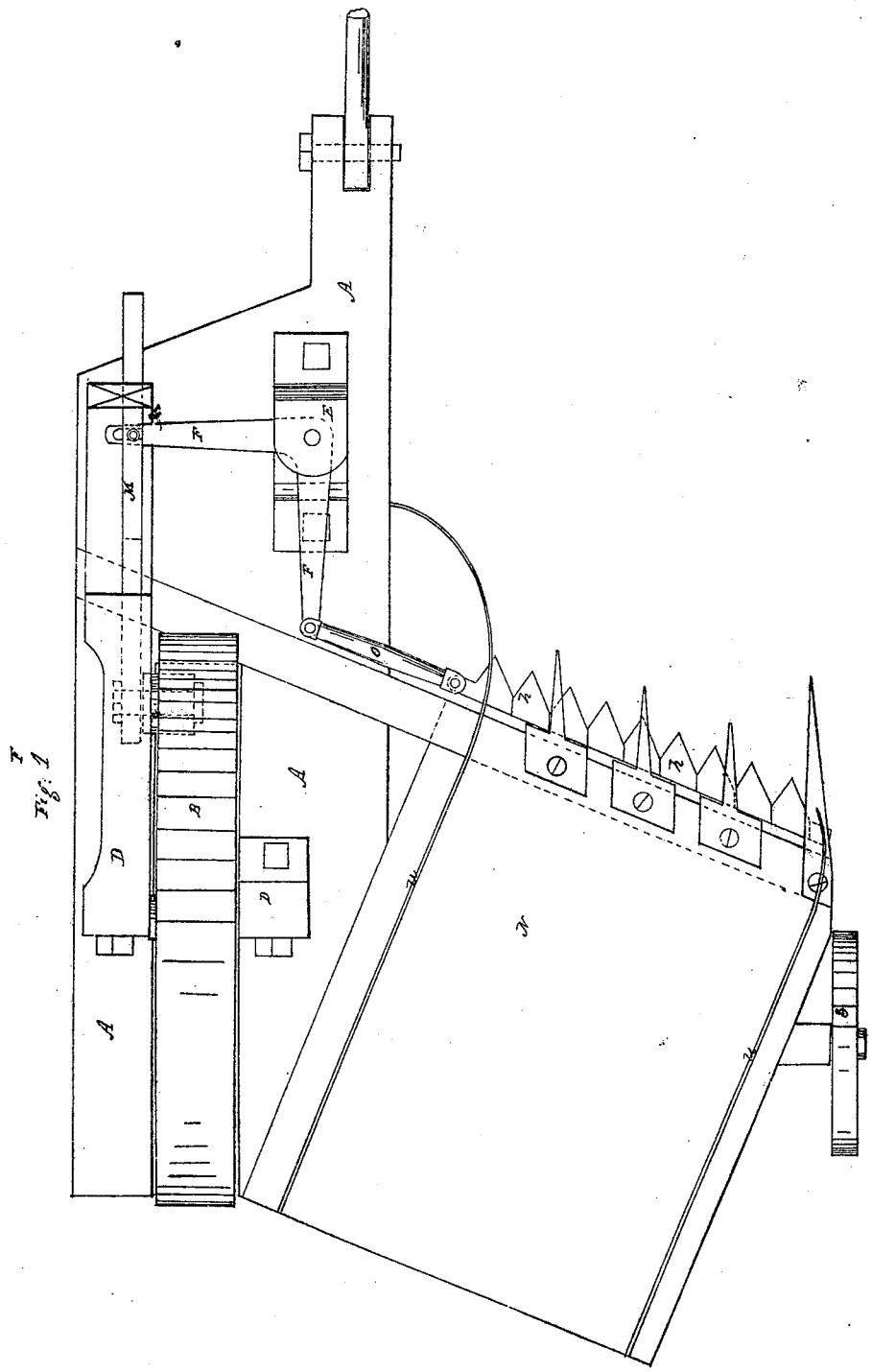

B. F. Ray.
Mower.

№ 14,205.  Patented Feb. 5, 1856.

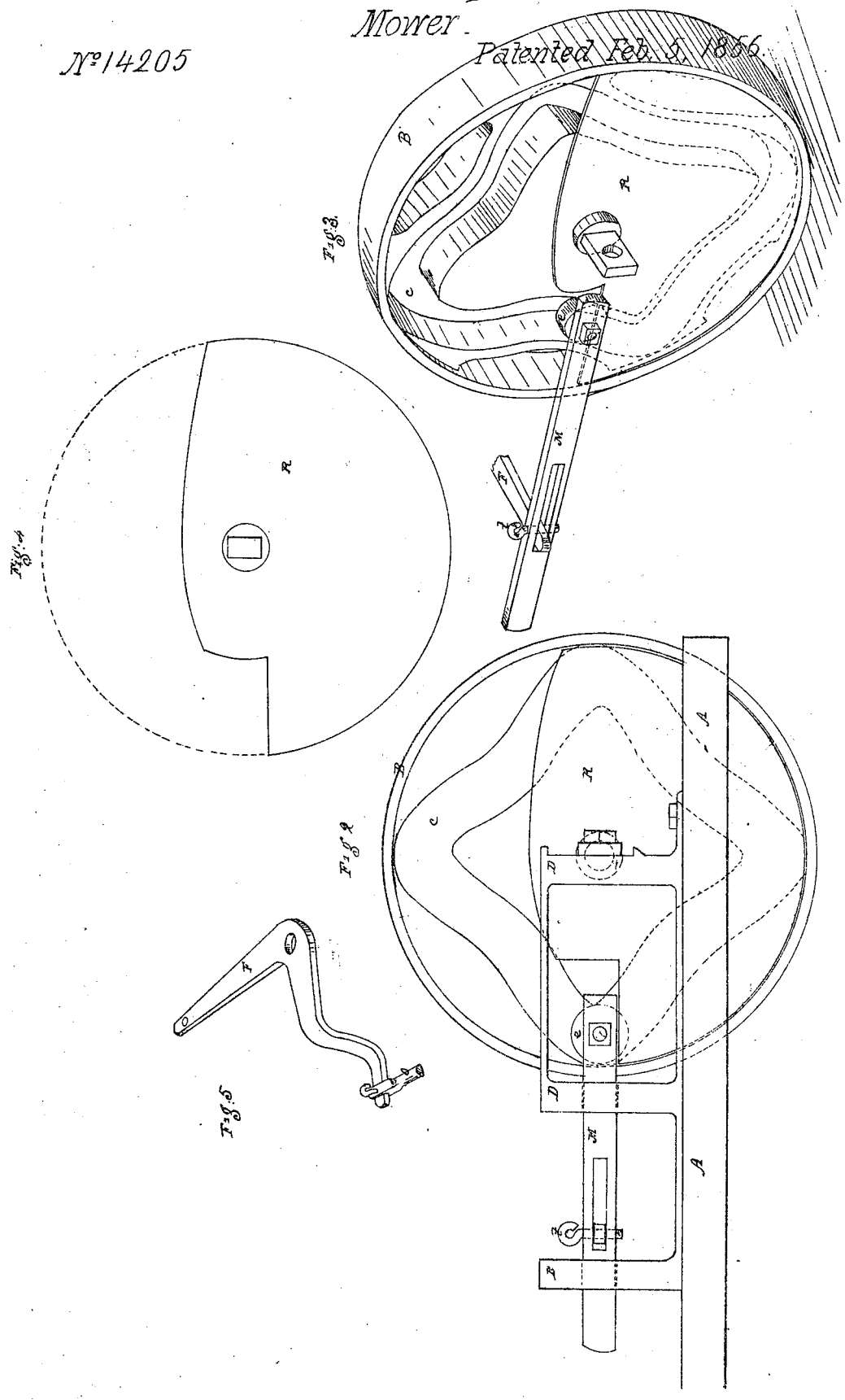

UNITED STATES PATENT OFFICE.

B. F. RAY, OF BALTIMORE, MARYLAND.

IMPROVEMENT IN HARVESTERS.

Specification forming part of Letters Patent No. 14,205, dated February 5, 1856.

*To all whom it may concern:*

Be it known that I, B. F. RAY, of the city and county of Baltimore, and State of Maryland, have invented certain new and useful Improvements in Machines for Cutting Grain and Grass, of which the following is a full, clear, and exact description, reference being had to the accompanying drawings, forming part of this specification, in which—

Figure 1 is a top view of my improved machine complete. Fig. 2 represents a side elevation. Fig. 3 is a view in perspective of the driving-wheel and stationary guard-plate detached, together with the friction-roller and sliding bar. Fig. 4 is a side view of the stationary guard-plate, also detached; and Fig. 5 is a perspective view of the bell-crank.

The same letters indicate the same parts in all the figures.

The nature of my invention consists in the arrangement of a stationary guard-plate fitted to the main driving-wheel of reaping and mowing machines for the purpose of excluding therefrom earth and other substances, by which the mechanism incased therein is liable to become clogged and deranged; also, in the peculiar arrangement of imparting direct and positive motion to the cutter-bar of reaping and mowing machines when said bar operates in a line more or less obtuse to the line of motion, as shown in the accompanying drawings, and in the arrangement of a slotted bar for the purpose of conveying the machine from one point to another without giving motion to the cutting apparatus.

To enable others skilled in the art to make and use my improved reaper and mower, I will proceed to a description of the same in detail.

A represents the main platform, to which is secured the main driving-wheel B, and upon which is also placed the mechanism through which motion is imparted to the cutting apparatus. Incased within or forming a part thereof of the driving-wheel B, I have formed a corrugated groove, c, to which is fitted a friction-roller, e. To this friction-roller e is secured the sliding bar M, by which said bar receives a reciprocating motion in a plane parallel with the center of the driving-wheel B.

D are brackets secured upon the main platform A, which support the driving-wheel B, and one of which serves as a guide to the sliding bar M, as represented in the side elevation.

E is also a bracket, which forms the fulcrum of the lever or bell-crank F.

O is a connecting-rod, one end of which is secured to the bell-crank F, while the opposite end is attached to the cutter-bar in the usual manner.

Secured to and forming a part thereof of the main platform A, I have constructed another platform in the shape of an oblong square, to one end of which is arranged the cutting apparatus. This oblong platform stands in such relation to the main platform A that the end upon which is secured the cutting apparatus forms an obtuse angle to the line of motion of the machine. By arranging the platform N angular to the line of motion, as shown in top view, Fig. 1, by throwing the outer end back of a point at right angles with the main platform A the rear end is drawn in toward the platform A, which deposits the cut grain in such position as to leave a track for the horses to travel in while cutting the succeeding swath. It will be observed that while the cutter-bar h is presented at an angle to the grain, the guard-fingers are placed parallel to the line of draft.

u are fences or guards constructed in the usual manner to prevent the grain from falling off the platform. In order to communicate direct and positive motion to the cutter-bar, arranged obliquely or at an angle obtuse to the line of motion of the machine, I have arranged a sliding bar, M, provided with a friction-roller, e, operating in the corrugated groove c, formed in the driving-wheel B. One end of the sliding bar M, being secured to the friction-roller e, running in the corrugated groove c, receives a reciprocating motion, while its opposite end, being secured to one arm of the bell-crank F, imparts through said crank F and connecting-rod o motion to the cutting apparatus. To effect direct communication to the oblique cutter-bar h through the sliding bar M, operated by the friction-roller e, running in the corrugated groove c, one arm of the bell-crank F is elongated and bent downward and secured to the connecting-rod o, as seen in Fig. 4. That the corrugated groove c or other mechanism which may be secured to the driving-wheels of reaping and mowing machines may not become clogged with earth or other substances, and to provide for the operation of the sliding bar M, attached to the friction-roller e, I have furnished the main driving-wheel B with a stationary guard-plate, R, which is supported upon the axle of the wheel B. This guard-plate R is fitted so closely to the inner periphery of the wheel B as to exclude all matter which would tend to obstruct the free operation of the mechanism incased therein. In the drawings I have represented the guard-plate R as covering the lower half only of the driving-wheel B; but it may extend over its entire surface, as shown in dotted lines, Fig. 4, in which case a notch is formed, in order to provide for the connection of the friction-roller e and sliding bar M.

In order that the machine may be conveyed to different points without giving motion to the cutting apparatus, and to protect and prevent the bell-crank from becoming twisted or bent for want of proper support, the sliding bar M is slotted, as seen in Figs. 2 and 3, which permits the bell-crank to remain stationary until secured by a pin or bolt, t.

To support the outer side of the oblong platform N a wheel, S, is secured thereto in the usual manner.

Having thus fully described my improved reaping and mowing machine, what I claim therein as new, and desire to secure by Letters Patent, is—

1. Providing the main or driving wheel of reaping and mowing machines with a stationary guard-plate, in the manner and for the purpose herein described.

2. The sliding bar arranged in the same horizontal plane with and perpendicular to the axle of the driving-wheel of reaping and mowing machines, in combination with the bell-crank for the purpose of giving direct and positive motion to the cutting apparatus when arranged obliquely to the line of draft, substantially as described.

3. Forming in the sliding bar a slot for the reception and operation of the bell-crank, as herein set forth.

B. F. RAY.

Witnesses:
ISAAC P. COOK,
JAMES DEW.